United States Patent [19]

Heitland et al.

[11] 4,135,492

[45] Jan. 23, 1979

[54] MANIFOLD ARRANGEMENT

[75] Inventors: Herbert Heitland, Wolfsburg; Edgard Grundmann, Fallersleben; Rudolf Kroll, Vorsfelde, all of Fed. Rep. of Germany

[73] Assignee: Volkswagenwerk Aktiengesellschaft, Wolfsburg, Fed. Rep. of Germany

[21] Appl. No.: 740,032

[22] Filed: Nov. 8, 1976

[30] Foreign Application Priority Data

Nov. 7, 1975 [DE] Fed. Rep. of Germany ....... 2550018
Dec. 17, 1975 [DE] Fed. Rep. of Germany ....... 2556747

[51] Int. Cl.² .............................................. F24J 3/02
[52] U.S. Cl. ..................................... 126/271; 237/1 A
[58] Field of Search ............... 126/270, 271; 237/1 A, 237/66, 59; 165/35, 38, 103

[56] References Cited

U.S. PATENT DOCUMENTS

| 1,946,184 | 2/1934 | Abbot | 126/271 |
| 3,254,644 | 6/1966 | Thannhanser | 126/271 |
| 3,277,884 | 10/1966 | Rowekamp | 126/271 |
| 3,321,012 | 5/1967 | Hervey | 126/271 |
| 3,986,666 | 10/1976 | Rietti | 237/59 |

FOREIGN PATENT DOCUMENTS

| 1084619 | 1/1955 | France | 237/56 |
| 1321696 | 2/1963 | France | 237/56 |
| 773659 | 5/1957 | United Kingdom | 126/271 |

*Primary Examiner*—Henry O. Yuen
*Attorney, Agent, or Firm*—Spencer & Kaye

[57] ABSTRACT

An inlet and/or outlet manifold arrangement for use with a conduit system of a solar radiation collector. The arrangement has inlet and outlet manifolds which are held in a given position and which are connected to the conduit system, there being an inlet communicating with the inlet manifold and an outlet communicating with the outlet manifold. At least the inlet manifold is equipped with a riser having a height such that when the pressure in the conduit system exceeds a predetermined value, the riser serves as an overflow which allows liquid to escape from the inlet manifold and to flow into the outlet manifold.

17 Claims, 4 Drawing Figures

MANIFOLD ARRANGEMENT

BACKGROUND OF THE INVENTION

The present invention relates to an inlet and/or outlet manifold arrangement for use with a conduit system, preferably one made of an elastic material, of a solar radiation collector.

There exist arrangements by means of which heat produced as the result of solar radiation is used to elevate the temperature of a body of water, as, for example, a swimming pool. The conduit system is made, for example, in the fashion of an air mattress, in that it is made of plastic sheets which are welded together along spaced-apart lines so as to form internal, meander-shaped paths through which water or other heat-carrying, liquid medium may flow between a liquid inlet and a liquid outlet. Alternatively, the solar radiation collector may be constituted by hoses or hose sections which provide as long a path as possible, so as to obtain optimum solar heat absorption while occupying a minimum of space. These hoses or hose sections may have blackened interior walls and be combined with each other so as to form a mat-like arrangement.

Arrangements of the above type, which may, of course, be used for various other purposes, such as for providing a hot water supply for a heating system, have to be constructed so as to meet certain requirements relating to flow characteristics, that is to say, the arrangement must be such that there will be adequate pressure to ensure proper liquid flow, although it will be appreciated that the available pressure is necessarily subject to certain limits.

It is, therefore, the primary object of the present invention to provide an arrangement of the above type which fulfills these requirements, namely, an arrangment in which due consideration is given to the flow characteristics, such that there will be sufficient pressure to maintain adequate liquid flow while avoiding loss of liquid from the system.

It is another object of the present invention to provide an arrangement of the above type which is structurally simple and which can be easily maintained.

BRIEF DESCRIPTION OF THE INVENTION

With the above objects in view, the present invention resides in a manifold arrangement for use with a conduit system of a solar radiation collector, which is equipped with an inlet manifold which is maintained in a given position, with an inlet which communicates with the manifold, with means for connecting the manifold with the conduit system, and with a riser which likewise communicates with the manifold distributor and has a height such that when the pressure in the conduit system exceeds a predetermined value, the riser serves as an overflow for allowing liquid to escape from the inlet manifold.

According to a further feature of the invention, the manifold arrangement as described above is combined with an outlet manifold which is likewise maintained in a given position, with an outlet which communicates with the outlet manifold, with further connecting means for connecting the outlet manifold to the conduit system, and with a further riser which communicates with the outlet manifold and which has a height such as to permit pressure increases of short duration for overcoming increased flow resistance caused by air pockets that may be present in the outlet.

According to yet another feature of the present invention, the parts are so arranged that any liquid overflowing the riser associated with the inlet manifold is transferred to the outlet manifold, so that no liquid is lost but is recycled within a closed system.

DETAILED DESCRIPTION OF THE PREFERRED EMBODIMENTS

Figure 1:
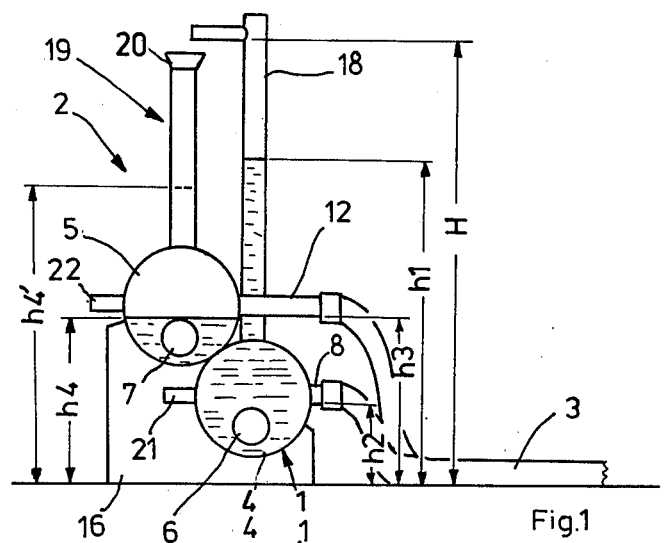
FIG. 1 is a side elevational view of one embodiment of an arrangement according to the present invention.
Figure 2:
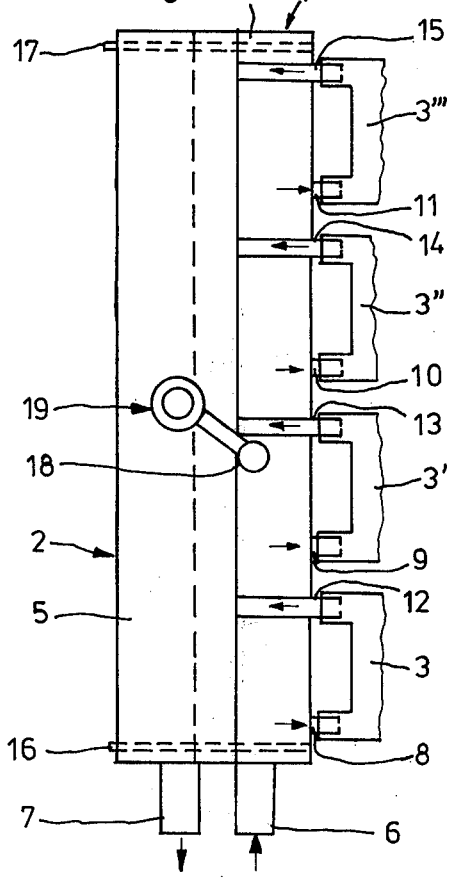
FIG. 2 is a top view of the embodiment shown in FIG. 1.

Referring now to the drawings and first to FIGS. 1 and 2 thereof, the same show an inlet and outlet arrangement incorporating an inlet manifold 1 and an outlet manifold 2, these two manifolds being combined into one structural entity. As shown in the drawings, the two manifolds are elevationally and laterally staggered such that the outlet manifold is somewhat higher than the inlet manifold and is somewhat further away from the conduit system 3 which connects the manifolds with the solar radiation collector (not shown). The conduit system is preferably made of a suitable elastic material.

Each of the manifolds comprises a tubular body shown at 4 and 5, respectively, and the two ends of each tubular body are closed off. The front end wall of the tubular body 4—this being the end wall depicted in FIG. 1—communicates with an inlet conduit 6 which itself is connected to a conventional water supply (not shown), the arrangement being such that the conduit 6 joins the front end wall at a level below the horizontal middle plane of the tubular body. Similarly, the outlet conduit 7 which delivers the heated water communicates with the front end wall of the tubular outlet body 5 below the horizontal plane of the latter.

The arrangement may, for example, be associated with a swimming pool, and the conduit 6 may, instead of being connected to a fresh water supply, be in communication with the swimming pool so that, by providing a suitable pump (not shown), the heated water in the pool coming from the conduit 7 may be recirculated through the arrangement 1, 2, thus forming a closed circulatory system.

FIG. 1 shows only one conduit system 3, but FIG. 2 shows four such systems at 3, 3', 3'', 3''', and to allow the four systems to function in parallel, the tubular body 4 is provided at its circumference with four aligned connectors 8, 9, 10, 11 which communicate directly with the respective systems 3, 3', 3'', 3'''. Similarly, the tubular outlet body 5 is provided at its circumference with four aligned connectors 12, 13, 14, 15 which likewise allow the four systems 3, 3', 3'', 3''', to be placed in communication with the body 5. The connections between the bodies 4, 5, and the four solar radiation collectors are established by hoses or other appropriate flexible conduits. As is readily apparent from FIG. 1, the connectors 8, 9, 10, 11, are located at the level h2, which is above the conduit system 3, 3', 3'', 3'''.

Each of the tubular bodies is provided with a riser 18, 19, which is open at the top and which is constituted by riser tubes made of transparent material, thus allowing the height of the liquid level to be observed.

As stated above, the inlet and outlet manifolds are combined with each other to form a single structural entity, and this is brought about by arranging the tubular bodies 4, 5, in appropriately positioned cutouts of two transverse carrier walls 16, 17, the latter thus serving as support means for the tubular bodies 4, 5. As is shown in the drawings, the tubular bodies extend at least approximately horizontally and are arranged parallel to each other. Consequently, the two risers 18, 19, will extend at least approximately vertically.

The length of the riser 18, indicated by the height H which shows the level of the top of the riser with respect to the floor, base or support on which the arrangement is positioned, is such that the liquid level in this riser will be reached only when a predetermined maximum pressure prevails in one of the four systems 3, 3', 3'', 3'''. Should this predetermined maximum pressure be exceeded, the liquid in the riser will pass through a laterally extending tube or channel whose end overlies the end 20 of the riser 19 which is associated with the tubular body 5 constituting the outlet manifold. As shown in the drawings, the upper end of the riser 19, which is likewise open to atmosphere, is funnel-shaped as shown at 20 so as to facilitate transfer of the liquid from the riser 18 to the riser 19. Consequently, if this predetermined maximum pressure is exceeded, liquid is transferred from the riser 18 to the riser 19 via the funnel-shaped end 20, so that the liquid is recirculated.

The riser 19 allows for short periods of pressure increase which may be necessary during initial transient conditions when the system is first turned on, so as to overcome an initial high flow resistance which may be caused by air pockets in the outlet conduit 7 or in the system to which the outlet conduit 7 is connected.

As shown in FIG. 1, the liquid level in riser 18 will, during normal, stabilized operation, reach a height shown at h1, which is above the level h3 of the connector 12 of the outlet manifold 2, the latter being a measure of the flow-through resistance through the arrangement according to the invention and of all of the conduit systems 3, 3', 3'', 3'''. The liquid level in the outlet manifold 2, on the other hand, will, in the course of stabilized operation, be within the tubular body 5 at a level indicated at h4. The level will reach the height shown at h4' as the result of pressure peaks which may arise during initial transient conditions.

As shown in FIG. 1, the location of the outlet conduit 7 determines the level h4 in the tubular body 5.

Thanks to the fact that, as stated above, the inlet and outlet conduits 6, 7 communicate with the tubular bodies 4, 5, respectively, below their respective horizontal middle planes, the tubular bodies are protected from damage or destruction due to the formation of ice, as may take place during winter or other cold weather operation. This, in turn, makes it possible to allow the arrangement to remain out of doors the year round without it being necessary to provide any special de-icing equipment, even if the arrangement is not in actual use.

The connectors 8 through 11 lie at the level shown at h2, whereas the connectors 12 through 15 lie at the level shown at h3. These levels, which are likewise taken with respect to the floor or support on which the structure is arranged, are different solely for structural reasons.

FIG. 1 shows each of the inlet and outlet manifolds 1, 2, as being equipped with a second connector 21, 22, respectively, so that the manifold arrangement can be fed from the left. If this is the case, the arrangement as a whole requires few structural elements but can be associated with a still larger number of solar radiation collector systems.

Figure 4:
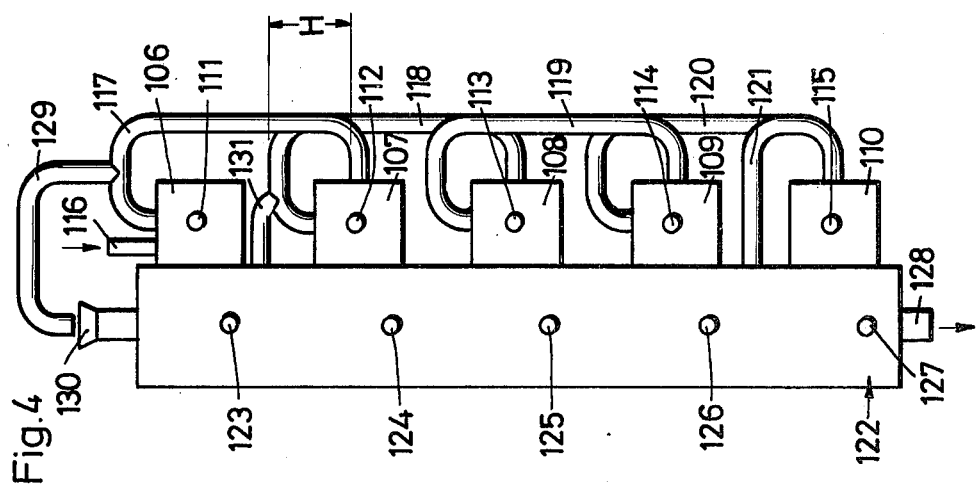
FIG. 4 is a side elevational view of the embodiment shown in FIG. 3.
Figure 3:
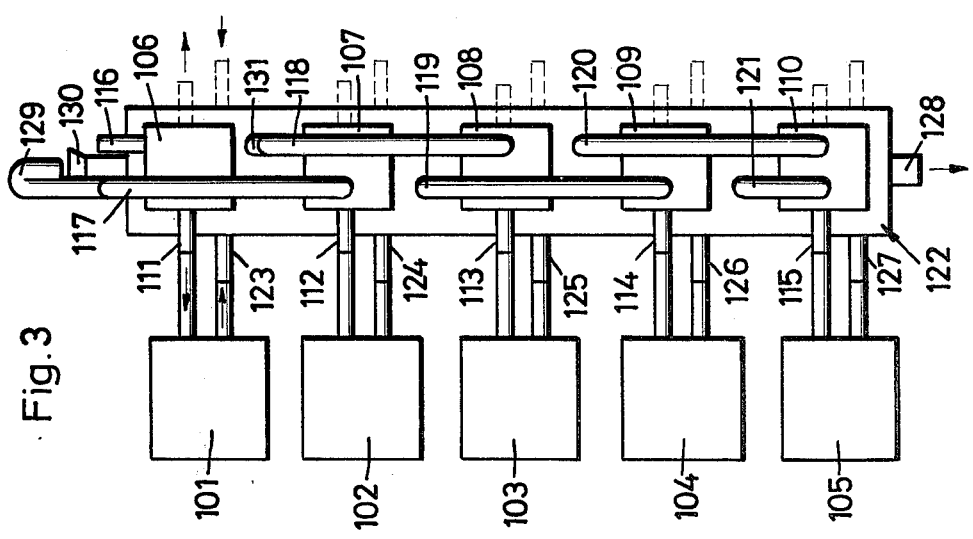
FIG. 3 is a front elevational view of another embodiment of an arrangement according to the present invention.

Referring now to the embodiment shown in FIGS. 3 and 4, the same is connected with five solar radiation collector systems 101, 102, 103, 104, 105. As in the solar radiation collectors used in conjunction with the above-described manifold arrangement, these solar radiation collectors may, for example, be constituted by mat-like elements made of plastic material and welded together in such a way as to form meandering paths leading from the inlet to the outlet end, through which the water may flow. Alternatively, the paths may be constituted by suitably positioned hoses or hose sections. In practice, the arrangement should be such that the water pressure does not fall below a predetermined minimum, so that the water will continue to flow without it being necessary to provide any pumping means.

As shown best in FIG. 3, the individual solar radiation collector conduit systems are arranged at different levels. This will be the case if the conduit systems are mounted on an inclined roof.

In order to maintain the predetermined pressure in all of the conduit systems, the manifold arrangement shown in FIGS. 3 and 4 incorporates five manifold chambers 106, 107, 108, 109, 110, each having a respective connector 111, 112, 113, 114, 115, to allow the heat carrying medium to flow into the individual collector systems 101 to 105. Also shown is an inlet conduit 116 which supplies all of the chambers and which itself is in communication with the uppermost manifold chamber, i.e., the chamber 106. The individual manifold chambers are provided with respective risers 117, 118, 119, 120, 121, each having a height H which will allow the pressure to reach the predetermined value in each of the attached collector systems 101 to 105. One significant practical advantage of this arrangement is that the height H of each individual riser can be adapted to meet the particular needs of each individual collector system. As soon as the pressure which is determined by the height of the respective riser is exceeded, the water will flow through the riser to the next lower manifold chamber, that is to say, water will flow through the riser 117 of the uppermost manifold chamber 106 into the next highest manifold chamber 107, and, as soon as the desired pressure is reached in that chamber, the third-highest manifold chamber 108 is supplied with water through the riser 118, and so on. The individual manifold chambers 106 to 110 can therefore be considered to be connected in cascade, whereas the individual collector systems 101 to 105, being connected to the connectors 111 to 115, respectively, can be considered to operate in parallel.

One exception to the foregoing is the riser 121 associated with the lowermost chamber 110, in that this riser 121 communicates with the common outlet manifold chamber 122. The level at which the riser communicates with chamber 122 is at a height which is determined by the desired pressure. This chamber 122 is additionally provided with further connectors 123, 124, 125, 126, 127, which are at different levels and which communicate with the return lines of the individual collector systems 101 to 105. The common outlet conduit 128 is at the lowest point of the outlet manifold chamber 122. In practice, the cross section of the outlet conduit 128 will be such that in no case will the liquid be allowed to accumulate in the chamber 122 in sufficient quantity to reach the level of the lowest connector 127.

In practice, individual ones of the manifold chambers 106 to 110 can be provided with further bypasses or risers to provide protection against sudden pressure peaks. One such bypass is shown at 129; the same is associated with the uppermost manifold chamber 106. The bypass 129 branches off the riser 117 and ends above the funnel-shaped vent opening 130 of the outlet manifold, which, in this embodiment, is in the form of an upright tubular element. Still another riser 131 is shown as being associated with the second highest manifold chamber 107.

The individual inlet manifold chambers 106 to 110 which are arranged next to the outlet manifold 122 are attached to or otherwise structurally combined with the latter so as to form a single structural entity. The entire arrangement can therefore easily be mounted on an inclined roof by means of hooks or other suitable fastening means.

If desired, each of the manifold chambers can be connected to two solar radiation collector systems, this being symbolized by the connectors shown in dashed lines extending laterally from the respective manifold chambers. Here, the risers 117 to 120 can have smaller cross sections because they will be called upon to carry smaller quantities of liquid.

It will thus be seen that thanks to the present invention, there is provided an arrangement in which the predetermined maximum pressure in the solar radiation collector is not exceeded, despite malfunction or improper actuation of a valve or the like which would cause too much water to be supplied to the system. In practice, the water supply to the arrangement can be set to a desired optimum simply by observing the height of the liquid column in the riser associated with the inlet manifold; for this purpose, the riser may be equipped with suitable markings. It will be appreciated, in this connection, that the riser associated with the outlet manifold serves a function that is in addition to that of the riser associated with the inlet manifold in that the former allows for pressure increases of short duration for overcoming increased flow resistance caused by air pockets that may be present in the outlet.

It will, moreover, be appreciated that, particularly in the embodiment of FIGS. 3 and 4, the arrangement may be positioned so as to lie at least approximately at right angles to the sun light impinging on the radiation collector, thus providing optimum operation even during those seasons when the sun lies relatively low on the horizon. It will be noted that this embodiment, though incorporating individual inlet manifold chambers, has these chambers interconnected with each other to produce the desired effect, as explained above.

It will be understood that the above description of the present invention is susceptible to various modifications, changes and adaptations, and the same are intended to be comprehended within the meaning and range of equivalents of the appended claims.

What is claimed is:

1. In an inlet and outlet manifold arrangement for use with a conduit system of a solar radiation collection, the combination which comprises:
    (a) means forming a generally horizontally oriented inlet manifold and a generally horizontally oriented outlet manifold, said inlet manifold comprising, as the main component, a horizontally arranged first tubular body provided with two first closing means for closing off the ends of said tubular body, said outlet manifold comprising, as the main component, a horizontally arranged second tubular body provided with two second closing means for closing off the ends of said second tubular body, said inlet and outlet manifolds being combined into a single entity;
    (b) support means for said inlet and outlet manifolds;
    (c) inlet means communicating with said inlet manifold and outlet means communicating with said outlet manifold, said inlet means passing through one of said first closing means and said outlet means passing through one of said second closing means;
    (d) first connecting means for connecting said inlet manifold to the conduit system, said first connecting means being arranged above said conduit system and the latter being connected directly to said first connecting means, said first connecting means being arranged on the circumference of said first tubular body;
    (e) second connecting means for connecting said outlet manifold to said conduit system, said second connecting means being arranged on the circumference of said second tubular body;
    (f) a first riser tube communicating with said first tubular body and having a height such that when the pressure in the conduit system exceeds a predetermined value, said first riser tube serves as an overflow for allowing liquid to escape from said first tubular body and therefore as a means for insuring that a given maximum pressure in said conduit system is not exceeded; and
    (g) means, constituted by a second riser tube, forming a second riser communicating with said second tubular body and having a height such as to permit pressure increases of short duration for overcoming increased flow resistance caused by air pockets that may be present in said outlet means.

2. The combination defined in claim 1, wherein the conduit system is made of elastic material.

3. The combination defined in claim 1, wherein said first riser tube is made of transparent material, thereby allowing the height of the liquid level in said first riser tube to be observed.

4. The combination defined in claim 1, wherein said first connecting means are at a level higher than that at which said inlet first means communicate with said inlet manifold.

5. The combination defined in claim 4, wherein said first connecting means are at a level which is at least as high as the maximum height of that portion of the conduit system which is filled with liquid.

6. The combination defined in claim 1, wherein said inlet means are arranged below and said first connecting means are arranged approximately at the level of the horizontal middle plane of said first tubular body.

7. The combination defined in claim 1 and suited for use with a plurality of conduit systems of a solar radiation collector, wherein there are a plurality of first and second connecting means for connecting said inlet and outlet manifolds with the plurality of conduit systems, thereby allowing parallel operation of said plurality of conduit systems.

8. The combination defined in claim 1, wherein said second riser tube is made of a transparent material, thereby allowing the height of the liquid in said second riser tube to be observed.

9. The combination defined in claim 1, wherein said second connecting means are at a level higher than that at which said outlet means communicate with said outlet manifold.

10. The combination defined in claim 9, wherein said outlet means are arranged below and said second connecting means are arranged approximately at the level of the horizontal middle plane of said second tubular body.

11. The combination defined in claim 9, wherein said second connecting means are at a level which is at least as high as the maximum height of that portion of the conduit system which is filled with liquid.

12. The combination defined in claim 1 and suited for use with a plurality of conduit systems of a solar radiation collector, wherein there are a plurality of first connecting means and a plurality of second means for connecting said inlet and outlet manifolds, respectively, with the plurality of conduit systems, thereby allowing parallel operation of the plurality of conduit systems.

13. The combination defined in claim 1, wherein said means maintain said first and second tubular bodies substantially parallel to each other.

14. The combination defined in claim 1, wherein said first and second connecting means are arranged on the same side of said single entity, said first connecting means being staggered in height with respect to said second connecting means.

15. The combination defined in claim 1, comprising third connecting means for connecting said inlet and outlet manifolds to the conduit system, said third connecting means being arranged on the opposite side of said entity as said first and second connecting means.

16. The combination defined in claim 1, wherein said first riser tube has an overflow opening which overlies an overflow opening of said second riser.

17. The combination defined in claim 16, wherein said overflow opening of said second riser is funnel-shaped.

* * * * *